(12) United States Patent
George et al.

(10) Patent No.: US 11,754,587 B2
(45) Date of Patent: Sep. 12, 2023

(54) ACTIVITY TRACKING USING MOTION SENSORS IN A WIRELESS LUMINAIRE NETWORK

(71) Applicant: ABL IP HOLDING LLC, Conyers, GA (US)

(72) Inventors: Sajin George, Somerville, MA (US); Antonio F. Mondragon, Cambridge, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 481 days.

(21) Appl. No.: 16/863,247

(22) Filed: Apr. 30, 2020

(65) Prior Publication Data

US 2021/0341508 A1    Nov. 4, 2021

(51) Int. Cl.
| | | |
|---|---|---|
| *G01P 13/00* | (2006.01) | |
| *H04L 67/12* | (2022.01) | |
| *G01J 5/10* | (2006.01) | |
| *G01J 5/00* | (2022.01) | |
| *H04L 41/0806* | (2022.01) | |

(52) U.S. Cl.
CPC ............ *G01P 13/00* (2013.01); *G01J 5/0025* (2013.01); *G01J 5/10* (2013.01); *H04L 41/0806* (2013.01); *H04L 67/12* (2013.01)

(58) Field of Classification Search
CPC .... H04W 84/18; G07C 9/00309; B60R 25/24
USPC ........................................................ 702/142
See application file for complete search history.

(56) References Cited

U.S. PATENT DOCUMENTS

| | | |
|---|---|---|
| 9,986,623 B1 | 5/2018 | Miu et al. |
| 10,334,706 B1 | 6/2019 | Lu et al. |
| 2014/0201281 A1* | 7/2014 | Tickoo .................. H04W 4/023 709/204 |
| 2016/0038088 A1* | 2/2016 | Lari ........................ A61B 5/11 600/595 |
| 2017/0018005 A1 | 1/2017 | Walden |
| 2017/0176964 A1 | 6/2017 | O'Keeffe |
| 2018/0096225 A1* | 4/2018 | Liu ......................... G06T 11/20 |
| 2018/0109913 A1 | 4/2018 | Walden et al. |
| 2019/0220736 A1 | 7/2019 | Lu et al. |
| 2020/0033463 A1* | 1/2020 | Lee ......................... G01S 11/06 |
| 2021/0099970 A1* | 4/2021 | Omer .................... G01S 13/886 |
| 2021/0185790 A1* | 6/2021 | Deixler ................. H05B 47/19 |

* cited by examiner

*Primary Examiner* — Fabricio R Murillo Garcia
(74) *Attorney, Agent, or Firm* — RatnerPrestia

(57) ABSTRACT

An example method includes determining, at an aggregated point in time, an aggregated space node motion amount detected in a plurality of node sensing areas of a plurality of the nodes. The determining the aggregated space node motion amount includes compiling a plurality of sensing records from a subset or all of the nodes created by the subset or all of the nodes at a time substantially close to the aggregated point in time. The method additionally includes computing a temporal aggregated motion amount detected in a node sensing area of a respective node over time, using the aggregated time node motion amount. The method further includes computing a spatial aggregated motion amount in a portion of a space, using the aggregated space node motion amount, wherein the portion of the space correlates to the node sensing areas of the plurality of nodes.

16 Claims, 10 Drawing Sheets

ACTIVITY TRACKING USING MOTION SENSORS IN A WIRELESS LUMINAIRE NETWORK

TECHNICAL FIELD

The present subject matter relates to techniques and equipment to track and aggregate movement in a space by using motion sensors (e.g., device free location sensors) embedded in a lighting system.

BACKGROUND

Online marketplaces have significantly increased the amount of data online retailers are able to collect about their customers' shopping habits, at an almost incidental level of cost: every single page view, every click shoppers make can be saved, analyzed, and applied to improve website performance and drive growth. This has put brick and mortar stores at a competitive disadvantage: high-quality consumer tracking in physical stores has been confined to research projects set in particular stores and using specialized data-gathering setups. Therefore, detailed consumer behavior data, such as consumer movement data, has not been available to most store operators. Updating such data has required the conduct of dedicated studies, and movement data has not been linked extensively to consumer-specific, out-of-store data.

While some stores have tried collecting consumer behavior and movement data using conventional video cameras, some consumers feel uncomfortable with this form of data collection when they are made aware of it. These consumers feel as though they are being individually surveilled, which can add stress to the shopping experience, and may ultimately result in less shopping trips, avoiding stores using video consumer analysis, and potentially even boycotts and adverse media coverage. Some retailers have even removed their consumer video analysis systems, citing that the advantages in data collection do not outweigh the loss of consumer goodwill.

These consumer surveillance concerns, however, do not dampen the need for businesses to collect consumer behavior data in order to perform more efficiently and effectively in the marketplace. Systems for tracking behavior, without making individual consumers feel watched, are nevertheless a strongly-felt need of the physical retailer trying to compete in the Internet Age.

SUMMARY OF INVENTION

Hence, there is still a need for further improvement in technologies for improvement in technologies for tracking consumer movement in a commercial space, without collecting individual or identifying information about the consumer at the point of collection. Aggregated metadata about consumer movement, collected by a motion sensor, can achieve the goals of collecting consumer movement like a video recording-based system, without individually identifying a consumer, and without capturing their individual precise movements.

An example system includes a plurality of nodes located in a space and a motion mapping server. Each of those nodes includes a network communication interface, a motion sensor, a processor, and a memory. The node network communication interface connects to a system network. The motion sensor is configured to sense motion in a node sensing area. The node processor controls the motion sensor and communicates via the node network communication interface. The node memory, coupled to the node processor, is configured to store a plurality of motion sensing records.

The node further includes node programming in the node memory. Execution of the node programming by the node processor configures the node to implement the following functions. The node creates a respective motion sensing record, based on motion sensed in the node sensing area by the motion sensor. The node also stores in the node memory the motion sensing record. Additionally, the node sends, via the node network communication interface of the node, the motion sensing record over the system network.

The motion mapping server includes a motion mapping server processor, a motion mapping server network communication interface, and a motion mapping server memory. The motion mapping server network communication interface is coupled to the motion mapping server processor and to the system network. The motion mapping server memory, coupled to the motion mapping server processor, is configured to store the respective motion sensing record sent by the respective node.

The motion mapping server includes motion mapping programming in the server memory. Execution of the motion mapping programming by the motion mapping server processor configures the motion mapping server to implement functions. The motion mapping server receives, via the system network, a motion sensing record from a node. The motion mapping server also determines, over an aggregated period of time, an amount of aggregated time node motion detected in the node sensing area of the node. The motion mapping server does this by compiling the plurality of motion sensing records from the node created by the node during the aggregated period of time. Additionally, the motion mapping server determines, at an aggregated point in time, an amount of aggregated space node motion detected in the node sensing areas of some or all of the nodes. The motion mapping server does this by compiling the plurality of sensing records from some or all of the nodes created by those nodes at a time substantially close to the aggregated point in time. Furthermore, the motion mapping server computes a temporal aggregated motion amount detected in the node sensing area of the respective node over time, using the aggregated time node motion amount. Still further, the motion mapping server computes a spatial aggregated motion amount in a portion of the space, using the aggregated space node motion amount where the portion of the space correlates to the node sensing areas of the plurality of nodes.

An example method includes receiving, via a system network, a respective motion sensing record of a respective node. The method also includes determining, over an aggregated period of time, an aggregated time node motion amount detected in a respective node sensing area of the respective node. The determining the aggregated time node motion amount includes compiling a plurality of motion sensing records from the respective node created by the respective node during the aggregated period of time. The method further includes determining, at the aggregated point in time, an aggregated space node motion amount detected in a plurality of node sensing areas of a plurality of the nodes. The determining the aggregated space node motion amount includes compiling a plurality of sensing records from a subset or all of the nodes created by the subset or all of the nodes at a time substantially close to the aggregated point in time. The method additionally includes computing a temporal aggregated motion amount detected in the node sensing area of the respective node over time, using the aggregated time node motion amount. The method still further includes computing a spatial aggregated motion amount in a portion of a space, using the aggregated space node motion amount. The portion of the space correlates to the node sensing areas of the plurality of nodes.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
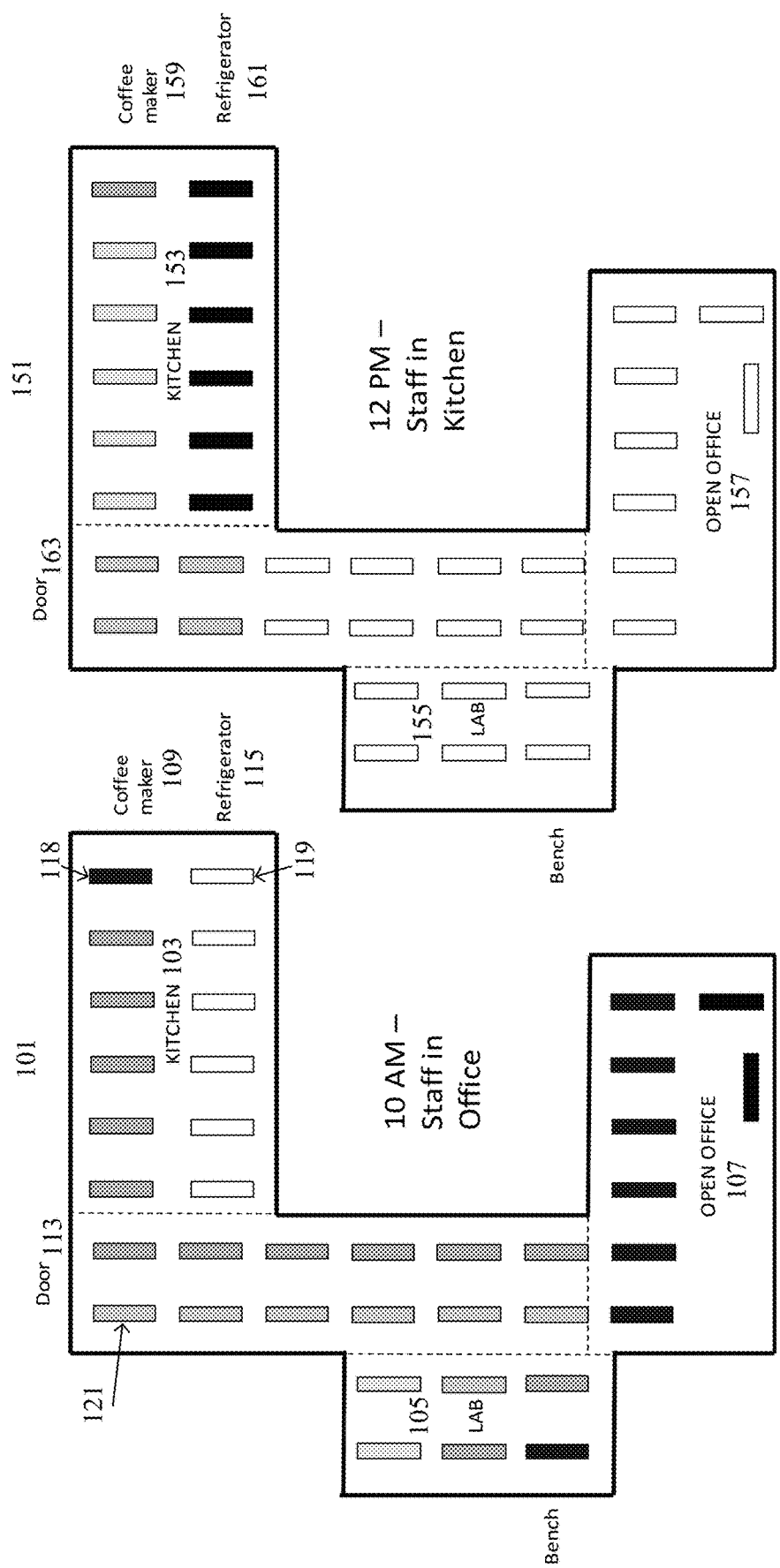
FIG. 1A is a heat map of an office with passive infrared sensors (PIRs) installed in the ceiling, measuring human activity in the morning.
FIG. 1B is a heat map of the same office in FIG. 1B, depicting measured human activity in the afternoon.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry signals.

The wireless enabled nodes may be nodes for wireless communication only. In many deployments, however, at least some of the wireless enabled nodes have additional hardware for other purposes. For example, some nodes may include sensors, some nodes may include components to monitor or control equipment (e.g. equipment of a heating, ventilation and air conditioning system, access control system, surveillance and alarm system, or the like). For illustration and discussion purposes, some or all of the wireless enabled nodes in the specific examples have additional hardware for lighting related purposes. Most such nodes may take the form of light fixtures or other types of luminaires that include light sources and associated driver circuitry, although some lighting system type nodes may include lighting related sensors (e.g. occupancy sensors and/or ambient light sensors), whereas other lighting system type nodes may include user interface hardware (e.g. to serve as wall-switches or wall controllers for user control of the luminaire nodes).

Software broadly encompasses executable program instructions and associated data if any that a programmable processor-based device utilizes to implement functions defined by the software. Various combinations of programming instructions and associated data fall under the broad scope of software. Firmware is a category of software. Although firmware may provide an operating environment for complex higher layer application programs; for a lower processing capacity device, such as a wireless enabled node for a controlled system (e.g. fixture or other device in a lighting system), the firmware provides all the programming for the data processing and operational control of device hardware to implement the wireless communications and any other functions of the particular device.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. Examples of luminaires include light fixtures for indoor and outdoor applications, floor lamps and table lamps; although luminaire related aspects of the examples may be implemented in other forms of lighting devices. The actual source of illumination light in or supplying the light for a light fixture or other type of luminaire may be any type of artificial light emitting component, several examples of which are included in the discussions below.

The space, where the nodal wireless network is operating, can include a variety of manmade structures or natural spaces modified by direct or indirect human efforts. The space conventionally may be a retail space, but it could also be, for example, an office space, a warehouse, or a hangar. It could also be an outdoor space with node installations, such as a parking lot, or a roadway. The space could also be a mixed use area, such as a transportation hub with both indoor and outdoor mesh network members, or an airport. A building space is a space that is partially or completely occupied by a structure.

The term "detector node" can include other elements such as electronics and/or support structure, to operate and/or install the particular node implementation. Such electronics hardware, for example, may include some or all of the appropriate driver(s) for any coupled illumination light source, any associated control processor or alternative higher level control circuitry, and/or data communication interface(s). As noted, the lighting component(s) are located into an integral unit, such as a light fixture or lamp implementation of the detector. The electronics for driving and/or controlling the lighting component(s) may be incorporated within the detector node or located separately and coupled by appropriate means to the light source component(s).

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as may be used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulb") of any suitable type. The illumination light output of an artificial illumination type luminaire, for example, may have an intensity and/or other characteristic(s) that satisfy an industry acceptable performance standard for a general lighting application.

Light output from the fixture or other type of luminaire may carry information, such as a code (e.g. to identify the luminaire or its location) or downstream transmission of communication signaling and/or user data. The light based data transmission may involve modulating or otherwise adjusting parameters (e.g. intensity, color characteristic or distribution) of the illumination light output from the device.

The term "node" may refer to an RF-enabled communication device that may provide communication services, e.g. for positioning services, building control system management services and the like. A node may be a connection point in a network that can receive, create, store and/or send data via communication links within the network. Each node is configurable to transmit, receive, recognize, process and originate and/or forward transmissions to other nodes, other devices operating as an access point to a network, or outside the network. The communication services provided by a node may enable networked and non-networked devices, such as asset tags, to send data to a node and receive data from the node.

Additionally, a "motion mapping" system is a system that provides position estimation services and in some cases additional position or location based services over any relatively limited area. The area so served may be partly or entirely confined within a building, ship, mine, or other enclosed structure, but is not necessarily so confined. Hence, a "positioning system" may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces).

Reference now is made in detail to the examples illustrated in the accompanying drawings and discussed below. FIG. 1 illustrates a diagram of ceiling-based motion sensors, and the amount of motion they sense in an example office space. FIG. 1A depicts an office floor 101, with a kitchen 103, a lab 105, and an open office desk area 107. The entire office floor 101 has mounted ceiling lights 121, each equipped with a motion sensor to detect motion in the area directly beneath a given ceiling light 121. In the diagram, the shading of a ceiling light 121 depicts how much movement that ceiling light has detected, in this example over the last ten minutes. Ceiling lights 121 with white centers 119 have detected very little if any motion below them, while ceiling lights 121 with black centers 118 have detected a high level of motion below them. An example of motion detection over time on a per-light 121 basis is discussed further in FIG. 6.

FIG. 1A is a depiction of the motion reported at 10 AM, and so it depicts the motion from the last ten minutes, resulting in a range of 9:50 AM to 10:00 AM. In this time span of 9:50 AM to 10:00 AM, typical morning office motions are detected by the ceiling lights. There is some motion detected as people move from the door 113 and go to the lab 105 or the open office desks 107. Once in the lab 105 or in the open office 107, the employees spend a substantial amount of their time within those rooms, and so the ceiling lights 121 detect almost constant movement. Additionally, some employees walk to the coffee maker 109, which results in more movement detected along that path, and almost constant movement in the direct vicinity of the coffee maker 109. Employees are not walking through the part of the kitchen 103 used for dining, including the refrigerator 115, and so those ceiling lights 121 detect very little, if any, movement. While movement can be a fluid concept, here the individual lights 117 aggregate the motion each individual light 117 experiences within the ten minute window. This helps make the movement data collected by each individual light 117 easier to consume for a user attempting to understand the movement under the system of lights 117. Additionally, aggregating movement within a period of time, here ten minutes, can normalize the data and remove movement outliers, such as individuals repeatedly moving back and forth under a number of lights 117 in a short period of time.

FIG. 1B is a depiction of the motion reported at 12 PM, and so it too depicts the motion from the last ten minutes, resulting in a range of 11:50 AM to 12:00 PM. In this time span of 11:50 AM to 12:00 PM, typical afternoon office motions are detected by the ceiling lights. Almost all of the employees have already moved from the open office 157 and lab 105 into the kitchen area 153. There is a high degree of motion detected near the refrigerator 161, when employees are retrieving their lunches, seating themselves, and eating as a group. Additionally, there is some movement recorded by the door 163, as a group of employees have left the office to purchase food from an outside vendor. There is some motion detected at, to, and from the coffee maker 159, but not near the level that was seen in the morning in FIG. 1A. There is no motion detected in this example in the lab 105 or open office 157 as the entire staff breaks for lunch at the same time.

Figure 2:
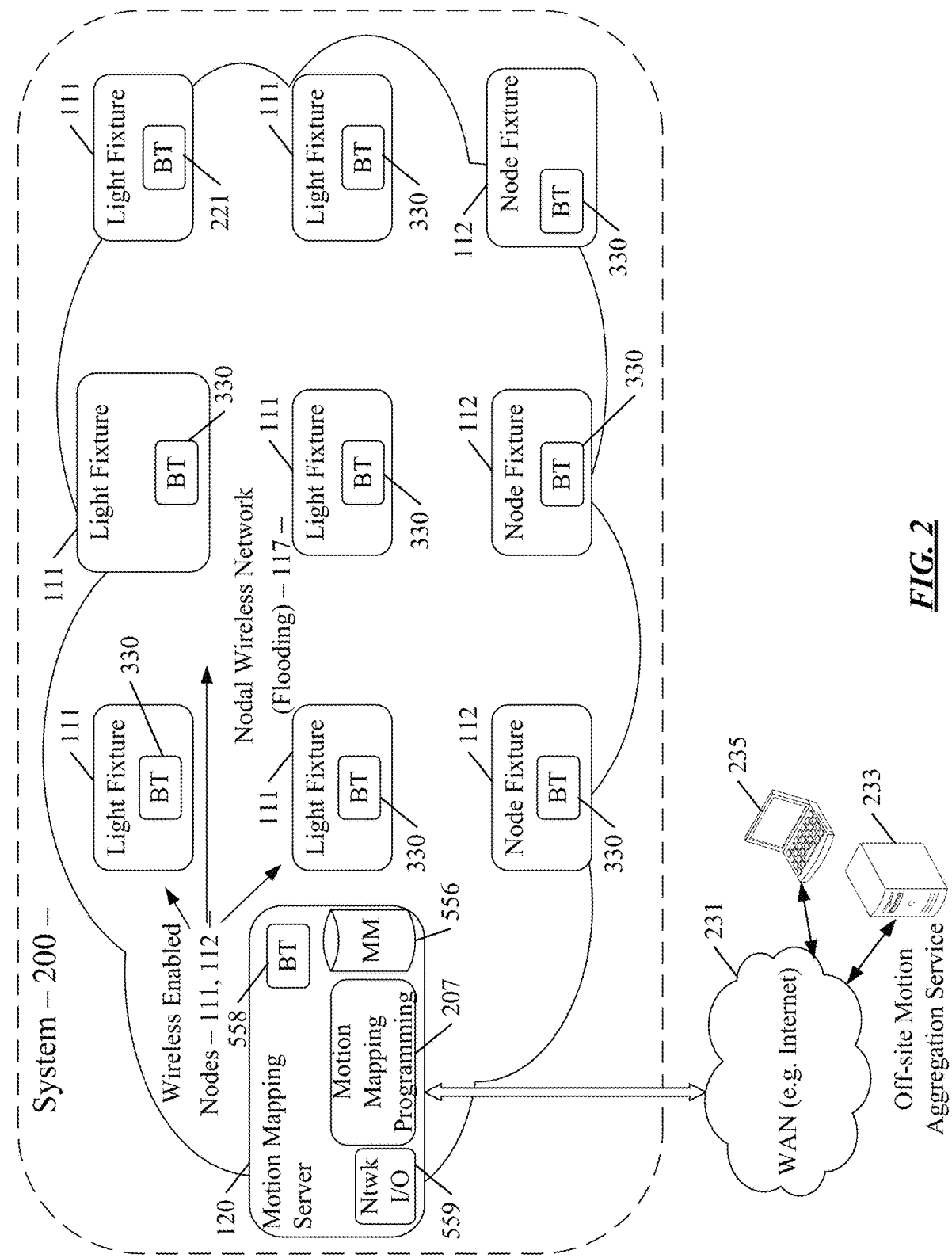
FIG. 2 is a high-level functional block diagram of a system, including wireless enabled nodes and a wireless enabled motion mapping server.

FIG. 2 illustrates an example system 200, which includes a motion mapping server 120, e.g., implemented as a wireless enabled computing device. Although other computing devices may be used, in the example, the computing device is a motion mapping server 120. The motion mapping server 120 serving as the wireless enabled computing device includes a motion mapping (MM) storage device that includes motion mapped files 556, such as a hard disk drive, volatile RAM, non-volatile flash memory, or high capacity semiconductor memory. The motion mapping server 120 also includes a processor shown in a later drawing, which executes motion mapping programming 207 that configures the motion mapping server 120. The device processor may execute other software to implement other functions of the motion mapping server 120. The motion mapping server 120 also includes a device radio frequency transceiver (element 558 of FIG. 5), which by way of example, may be circuitry in a Bluetooth radio circuit (BT). This will be discussed in more detail later. Other radio technologies instead of or in addition to Bluetooth radios may be used in systems similar to the example system 200.

The example system 200 also includes wireless enabled nodes 111, 112 configured into a nodal wireless network 117 with the motion mapping server 120 forming the wireless enabled computing device. Although other radio technologies may be used, the example utilizes Bluetooth radios in the example. Although other types of networking or protocols may be utilized, the example network 117 implements a "flooding" type wireless protocol. Other example network protocols include "star", "bus", "ring", and "mesh" type wireless protocols.

Each respective wireless enabled node 111, 112 includes a node radio frequency transceiver, a node processor, memory, and firmware stored in the memory for execution by the node processor to implement operations of the respective wireless enabled node (as shown in later drawing FIGS. 3 and 4). At least one of the wireless enabled nodes is a node of a first type configured to operate a motion detecting sensor.

In the example, wireless communication transceivers of the nodes 111, 112 and of the motion mapping server 120 form the nodal wireless network 117. Although the network 117 may use other networking technologies or protocols, the example network 117 is a flooding (e.g. non-routed) type nodal wireless network. In such an example, the nodal network 117 implements a flooding type protocol so as to distribute a transmitted packet from any source on the network throughout the nodal network 117. The motion mapping server 120, for example, is configured to introduce each downstream message packet into the nodal wireless network 117, and the flooding through the network 117 distributes the packet to all of the wireless enabled nodes 111, 112 on that network 117. The payload of the packet is extracted and utilized ("consumed") by each node 111, 112 for which the payload is intended, e.g. based on a destination address of the packet, a group address in the packet, or a node type identifier in the packet. If the same protocol is used for packet communications from the nodes 111, 112, each node 111, 112 is configured to introduce any upstream message packet into the nodal wireless network 117, and the flooding through the network 117 distributes the upstream packet to motion mapping server 120 and to all other wireless enabled nodes 111, 112 on that network 117. Typically, upstream message packets are addressed to the motion mapping server 120, and the payloads thereof are only consumed by the motion mapping server 120 (e.g. to receive acknowledgements of downstream transmission or to receive status reports from light fixtures or other nodes on the network 117). In some network architectures, such as a Bluetooth implementation, the network 117 may also support some point-to-point communications.

For example, some nodes may include sensors, and some nodes may include components to monitor or control equipment (e.g. equipment of a heating, ventilation and air conditioning system, access control system, surveillance and alarm system, or the like). For illustration and discussion purposes, the system 200 is a controlled lighting system. In such a system 200, some or all of the wireless enabled nodes 111, 112 have additional hardware for lighting related purposes. Hence, for illustration and discussion purposes, in the example system 200, the wireless enabled nodes 111, 112 take the form of light fixtures or other types of luminaires that include light sources and associated driver circuitry (as shown by way of example in FIGS. 3 and 4). Nodes with sensors or user interface elements are omitted for convenience.

The wireless enabled nodes 111, 112 of system 200 has example nodes of at two different types. Both types of node could be present in the system 200, or a single type of node could be present, or another type based on one of the two example types could be present. Although other arrangements of processor, memory and transceivers may be used, the examples use arrangements in which, in each respective wireless enabled node, the node radio frequency transceiver, the node processor and the memory are elements of a single radio circuit. Such a radio circuit, for example, may include circuits for the node transceiver, node processor and node memory integrated as a single chip device referred to as a system-on-a-chip (SoC). For convenience, further discussion below often focuses on SoC type examples, although as noted, wireless enabled nodes in a system with the selective update technology may use other arrangements of the radio circuitry and/or of the overall circuitry of one or more nodes.

The radio transceivers may implement a variety of wireless communication technologies/standards, such as Bluetooth, WiFi, Cellular 4G or 5G, Zigbee or the like. For illustration and discussion purposes, the examples utilize Bluetooth radios. Since the SoC type radios use Bluetooth, they are identified in FIG. 1 as radios. The wireless enabled node type of the light fixtures and thus of the BT radios may differ as to the circuit structure of the radio (e.g. different node processor, node memory with different capacity, or different node transceiver circuit). Structurally different radios will have different firmware images and receive different firmware updates. Even if the hardware structure of the BT radios is the same or similar, the node type may differ if other hardware differs, e.g. if the light fixtures have different artificial light sources and/or different driver circuits. Where the light hardware differs, for illustration purposes, the node and radio types differ (even if the radio hardware is the same) because such different fixtures require that the smart BT radios have different firmware images and receive different firmware updates.

In the example of FIG. 2, the wireless enabled computing device is a motion mapping server 120 in that it supports communications between the nodal wireless network 117 and one or more external networks, such as the wide area network (WAN) 231. The WAN 231 may be the Internet or an Intranet or the like. For communication with the WAN 231, the motion mapping server 120 type computing device includes an appropriate network input/output (I/O) interface 209.

The drawing shows a host or server type network-connected computer 233 and a laptop type user terminal device 235, as non-limiting examples of external equipment that may communicate with the system 200 via the network 231 and the motion mapping server 120, for various data gathering or control purposes.

Therefore, FIG. 2 depicts a system 200 comprising a plurality of nodes 111, 112 in a space. Each of these nodes 111, 112 has a node network interface, or wireless transceiver 350 that is connected to the nodal wireless network 117. The wireless transceiver 350 may be a wireless radio-frequency communication interface. The nodes 111, 112 also have motion sensors, in this example passive infrared sensors 318, which are configured to sense motion in a node sensing area 725. In other examples, the motion sensors are other device free location sensors, which are location sensors that do not require a device on the object to be located in order to locate that object. In still other examples, the motion sensors are any kind of motion sensing device. Node sensing areas 725 are depicted in further detail in FIGS. 7-8. The motion sensors may be passive infrared sensors 318, but in other examples could be a different form of motion detector. Each motion sensor 318 has its own motion sensing area, which is distinct but may partially or fully overlap the motion sensing area of another motion sensor 318. These motion sensing areas in some examples may be adjusted by changing the sensor field of view of the motion sensor 318, which in some examples is a passive infrared sensor 318. In some examples this sensor field of view may be adjusted via a focusing mechanism attached to the motion sensor 318. The nodes 111, 112 also have a processor or CPU 343 that is connected to both the motion sensor 318 and the wireless transceiver 350. The connection between the wireless transceiver and the CPU 343 allows the nodes 111, 112 to communicate over the nodal wireless network 117. The CPUs 343 of the nodes 111, 112 are also connected to memory 342. The memory 342 of each node 111, 112 is configured to store a plurality of motion sensing records 347 created by the CPU 343.

The node 111 may also include a light source, such as an LED light source 320. Some or all of the plurality of nodes 111, 112 may be ceiling nodes 121: a ceiling node 121 is a node which has the node sensing area 725 of that node below the node itself. These ceiling nodes 121 may have a node sensing area 725 that corresponds to the size and shape of the ceiling node 121: meaning that, if the ceiling node 121 is rectangular, then the node sensing area 725 will also be substantially rectangular; if the ceiling node 121 is oval, then the node sensing area 725 will also be substantially oval.

The memory components 342 also includes node programming 345, wherein execution of the node programming 345 by the CPU 343 of a node 111, 112 configures that node 111, 112 to implement the following functions. Executing node 111, 112 creates a respective motion sensing record 347, based on the motion sensed in the node sensing area 725 of the motion sensor 318 of the executing node 111, 112.

The record is created via the CPU 343 of the executing node 111, 112. The executing node 111, 112 also stores in the memory 342 of the executing node 111, 112 the created motion sensing record 347. Additionally, the executing node 111, 112 sends, via the wireless transceiver 350 of the executing node 111, 112 that created motion sensing record 347, into the nodal wireless network 117.

In further implementation of these functions, the executing node 111, 112 aggregates, based on a predetermined aggregation criteria 349, an aggregated motion sensing record. The predetermined aggregation criteria 349 aggregates one or more motion sensing records 347 by determining the percentage of time the motion sensor 318 sensed motion during an interval of time, as compared to the entire interval of time, including periods where the motion sensor 318 did not sense motion. The aggregation may be a running average, or a time-binned average: both methods are discussed in more detail in FIG. 9. The aggregation may further be a time domain filtering aggregation, or a space time filtering aggregation: any type of aggregation method is acceptable. This record comprises a selection of the motion sensing records 347 created by the CPU 343 of the executing node 111, 112. These records before aggregation may have been stored in the memory 342 of the executing node 111, 112. The executing node 111, 112 also sends, via the wireless transceiver 350 of the executing node 111, 112 the created aggregated motion sensing record as a motion sensing record 347. Meaning, any recipient on the nodal wireless network 117 of the aggregated motion sensing record sent as a motion sensing record 347 could view and treat the aggregated motion sensing record as if it was simply a motion sensing record 347.

Figure 5:
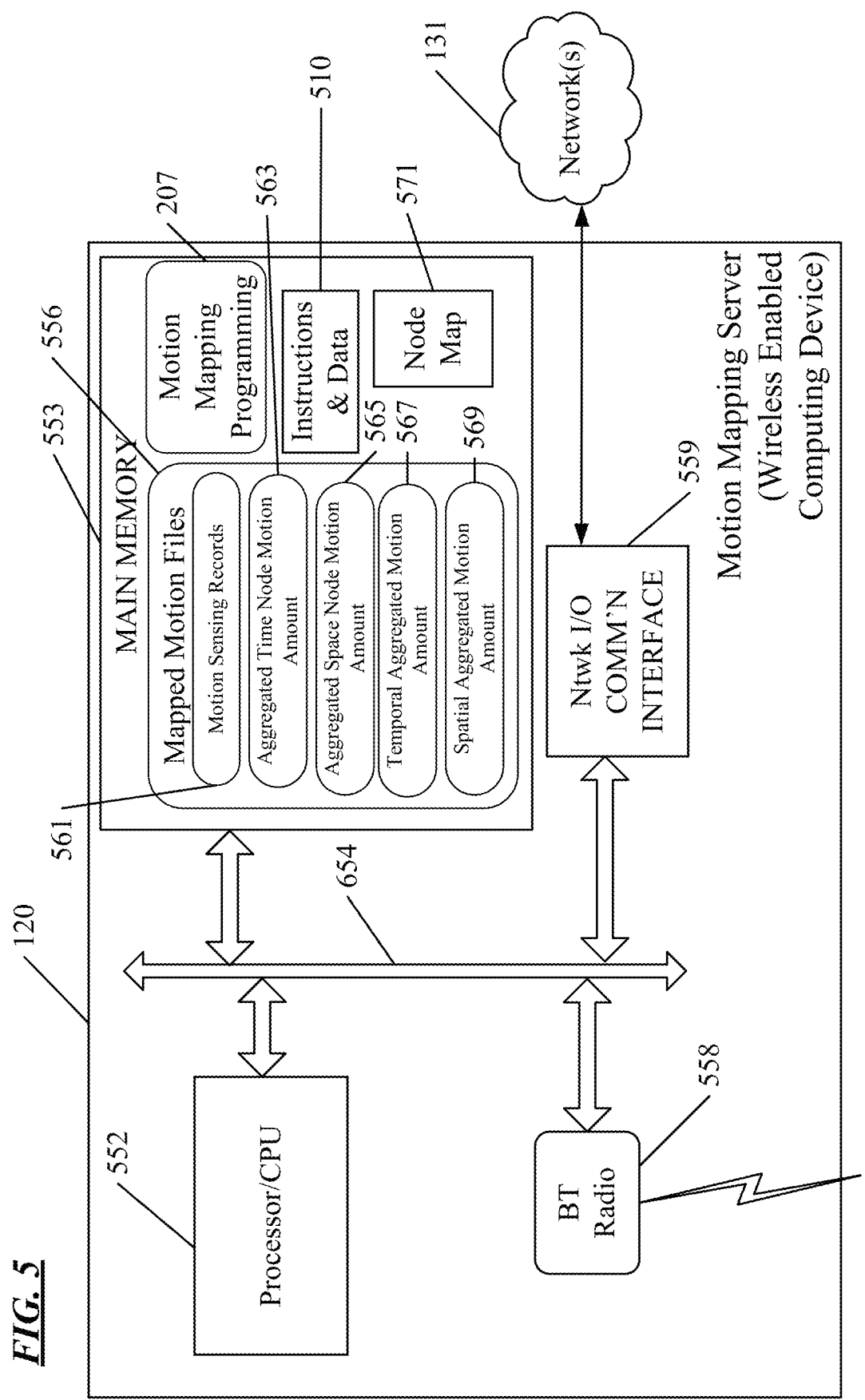
FIG. 5 is a simplified, functional block diagram of an example of a hardware platform for a motion mapping server, as may be used in the example system of FIG. 1.

FIG. 5 also depicts a motion mapping server 120 with a processor 552 and a network communication interface in the form of a Bluetooth radio 558. This Bluetooth radio is connected to the processor 552 and is configured to connect to the nodal wireless network 117. The motion mapping server 120 also has a memory 553 which is connected to the processor 552, and is configured to store motion sensing records sent by nodes 111, 112.

The memory components 553 also includes motion mapping programming 207. Execution of the motion mapping programming 207 by the processor 553 of the motion mapping server 120 configures the motion mapping server 120 to implement the following functions. Motion mapping server 120 receives motion sensing records 561 via the nodal wireless network 117 from the nodes 111, 112. The motion mapping server 120 also determines, over an aggregated period of time, an aggregated time node motion amount 563 detected in the respective node sensing area 725 of the respective node 111, 112, by compiling the plurality of motion sensing records 561 from the respective node 111, 112 created by the respective node 111, 112 during the aggregated period of time Additionally, the motion mapping server 120 determines, at an aggregated point in time, an aggregated space node motion amount 565 detected in the node sensing areas 725 of a subset or all of the nodes 111, 112, by compiling the plurality of sensing records 561 from the subset or all of the nodes 111, 112 created by the subset or all of the nodes 111, 112 at a time substantially close to the aggregated point in time Furthermore, the motion mapping server 120 computes a temporal aggregated motion amount 567 detected in the node sensing area 725 of the respective node 111, 112 over time, using the aggregated time node motion amount 563.

Still further, the motion mapping server 120 computes a spatial aggregated motion amount 569 in a portion of the space, using the aggregated space node motion amount 565 where the portion of the space correlates to the node sensing areas 725 of the plurality of nodes 111, 112.

In another example, the motion mapping server 120 in computing the temporal aggregated motion amount 567 detected in the node sensing area 725 of the respective node 111, 112 over time further graphs the temporal aggregated motion amount 567 detected in the node sensing area 725 of the respective node over time 111, 112.

In an additional example, the motion mapping server in computing the spatial aggregated motion amount 569 in the portion of space further graphs the spatial aggregated motion amount 569 in the portion of the space. In a variation on this example, motion mapping server 120 in graphing the spatial aggregated motion amount 569 in a portion of the space further uses a map 571 of the locations of the nodes 111, 112 within the space, and the area dimensions of the node sensing areas 725 of each of the nodes 111, 112 within the portion of the space.

The system 200 may supplement functionality in motion detection by incorporating into or collaborating with other motion or person detection systems. These other motion or person detection systems may share sensors, hardware, physical locations, programming, and other resources with the system 200. Additionally, the system 200 and the other motion or person detection systems may output a combined data structure, report, or feed for analysis and use. Examples of person detection systems based on analyzing propagation of RF waves are disclosed in U.S. patent application Ser. No. 15/447,093, filed Mar. 1, 2017, entitled "System and Method for Estimating the Number of People In a Smart Building," now U.S. Patent Publication No. 2017/0176964; U.S. patent application Ser. No. 15/720,254, filed Sep. 29, 2017, entitled "Occupancy and Non-Occupancy Detection In the Lighting System," now U.S. Pat. No. 9,986,623; U.S. patent application Ser. No. 15/870,003, filed Jan. 12, 2018, entitled "System Level Occupancy Counting In a Lighting System," now U.S. Patent Publication No. 2019/0220736; and U.S. patent application Ser. No. 15/840,616, filed Dec. 13, 2017, entitled "Heuristic Occupancy and Non-Occupancy Detection In the Lighting System," now U.S. Pat. No. 10,334,706, the entire contents of which are incorporated by reference herein. These applications in particular describe alternative motion sensors, which are RF transceivers, as the motion sensors 318 used in the system 200. For example, the motion sensor 318 includes a wireless communication transmitter for wireless radio communication in the area via a wireless radio communication network in real time that transmits an RF signal at plurality of times. The motion sensor 318 also includes a wireless communication receiver that receives the transmissions of the RF signal through the area at the plurality of times and generate an indicator data of a signal characteristics the RF signal at the plurality of times. The motion sensor 318 incudes a detector that obtains the indicator data of the RF signal generated at the plurality of times from the wireless communication receiver. The detector compares the indicator data generated at the current time among the plurality of times with the indicator data generated at a preceding time among the plurality of times before the current time to determine a rate of change. The detector compares the indicator data generated at the plurality of times with a baseline indicator data at an earlier time to generate a difference value, wherein the earlier time is different from the plurality of times, wherein the baseline indictor data defines the non-occupancy condition. The detector determines an indicator data metric based on the rate of change and the difference value. The detector compares the indicator data metric with one of a rising transition threshold or a falling transition threshold at each of the plurality of times to detect one of an occupancy condition or a non-occupancy condition in the area, which correlates to activity/motion.

Figure 3:
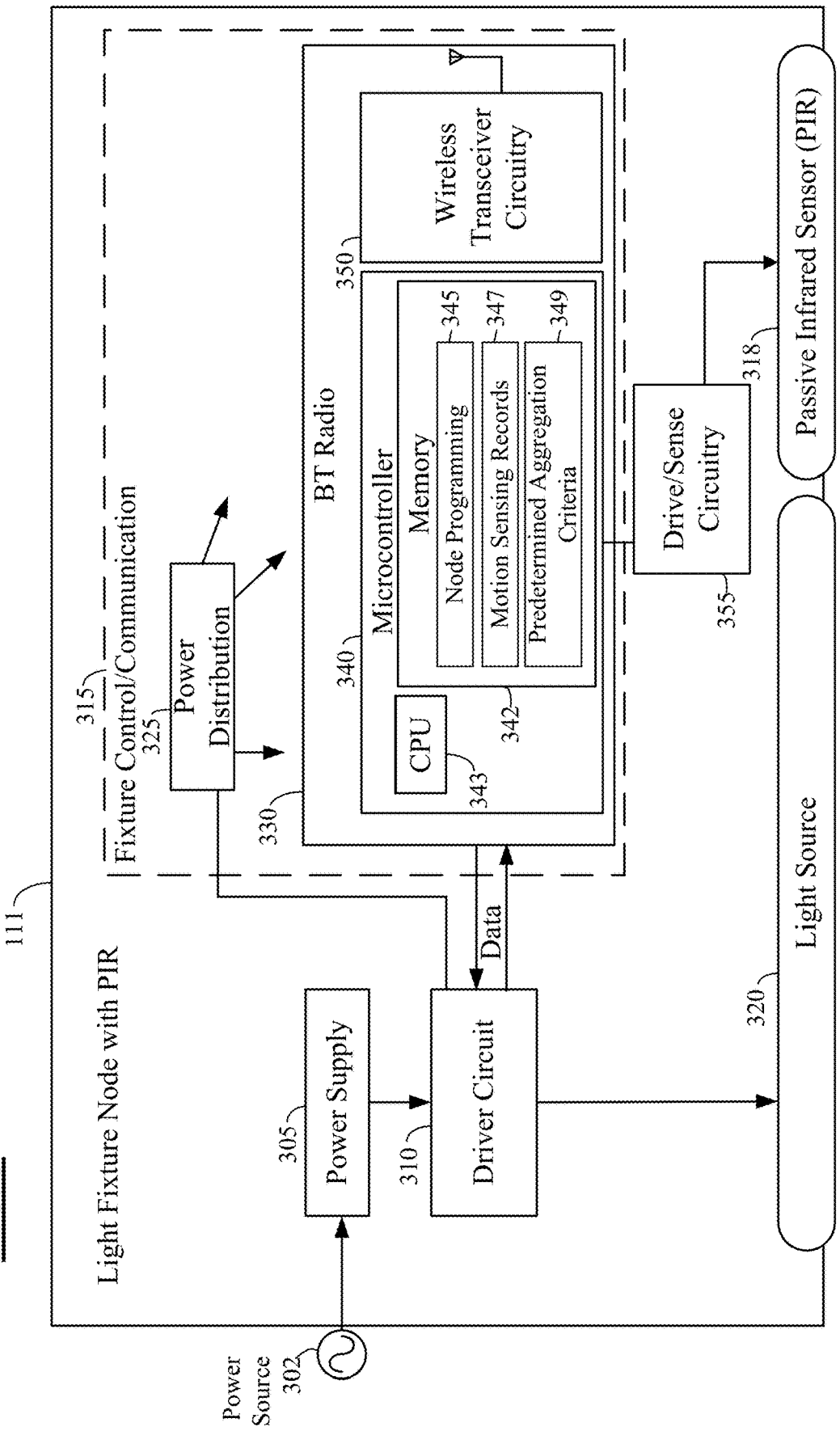
FIG. 3 is a high-level functional block diagram of a light fixture example of a wireless enabled node having a passive infrared sensor.

As shown in FIG. 3, the radio 330 of the light fixture node with passive infrared (PIR) 111 includes a micro-control unit (MCU) 340, and wireless transceiver circuitry. As shown, MCU 340 is coupled to driver circuit 310 and controls the lighting operations of the light source 320 via the driver circuit 310. The MCU 340 includes a memory 342 (e.g. volatile RAM and non-volatile flash memory or the like) and a node processor in the form of a central processing unit (CPU) 343. The memory 342 stores instructions for implanting the operations of the first type fixture node 111, for lighting control operations, commissioning, maintenance, and diagnostic operations and for controlling communications and/or data processing related to functions of the lighting system 100. The memory 342 further stores instructions for operating the passive infrared sensor 318 interfacing with the consumer movement detection system 130.

Light fixture node 111 includes a power supply 305 driven by a power source 302. Power supply 305 receives power from the power source 302, such as an AC mains, battery, solar panel, or any other AC or DC source. Power supply 305 may include a magnetic transformer, electronic transformer, switching converter, rectifier, or any other similar type of circuit to convert an input power signal into a power signal suitable for light source 320. Light source 320 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 320 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Light fixture node 111 further includes, a driver circuit 310, for example, an intelligent light emitting diode (LED) driver circuit. Driver circuit 310 is coupled to light source 320 and drives that light source 320 by regulating the power to light source 320 by providing a constant quantity or power to light source 320 as its electrical properties change with temperature, for example. The driver circuit 310 provides power to light source 320. Driver circuit 310 may be a constant-voltage driver, constant-current driver, or AC LED driver type circuit that provides dimming through a pulse width modulation circuit and may have many channels for separate control of different LEDs or LED arrays that comprise light source 320. An example of a commercially available driver circuit 310 is manufactured by EldoLED®.

Driver circuit 310 can further include an AC or DC current source or voltage source, a regulator, an amplifier (such as a linear amplifier or switching amplifier), a buck, boost, or buck/boost converter, or any other similar type of circuit or component. Driver circuit 310 outputs a variable voltage or current to the light source 320 that may include a DC offset, such that its average value is nonzero, and/or an AC voltage.

For purposes of communication and control, light fixture node 111 is treated as a single or a multi-addressable device that can be configured to operate as a member of the nodal wireless network 117. Light fixture node 111 includes power distribution circuitry 325, a microcontroller 340, and a memory 342. As shown, microcontroller 340 is coupled to driver circuit 310 and the microcontroller 340 includes a central processing unit (CPU) that controls the light source operation of the light source 320. Memory 342 can include volatile and non-volatile storage.

The power distribution circuitry 325 distributes power and ground voltages to the CPU 343, memory 342, network communication interface(s) 350 (e.g., wireless transceivers), drive/sense circuitry 355, and detector(s) 318 to provide reliable operation of the various circuitry on the light fixture node 111.

Network communication interface(s) 350 allows for data communication (e.g., wired or wireless) over various networks, including the nodal wireless network 117. For example, light fixture node 111 can includes one band, dual-band, or tri-band wireless radio communication interface system of Network communication interface(s) 350 configured for wireless communication via separate radios that operate at three different frequencies, such as sub-GHz (SigFox, Lora), 2.4 GHz (Bluetooth, WiFi 802.11b/g/n/ax, Zigbee, etc.), and 5 GHz or 5.8 GHz WiFi 802.11a/h/j/n/ac/ax, for example. At least one wireless transceiver 1145 is for communication over the nodal wireless network 117.

Microcontroller 340, including like that shown for the processor/CPU 552 of the motion mapping server in FIG. 5, serve to perform various operations, for example, in accordance with instructions or programming executable by processors 343, 552. For example, such operations may include operations related to communications with various system 200 elements, such as nodes 111, 112. Although a processor 343, 552 may be configured by use of hardwired logic, typical processors are general processing circuits configured by execution of programming. Processors 343, 552 include elements structured and arranged to perform one or more processing functions, typically various data processing functions. Although discrete logic components could be used, the examples utilize components forming a programmable CPU.

A processor 343, 552 for example includes one or more integrated circuit (IC) chips incorporating the electronic elements to perform the functions of the CPU. The processors 343, 552 for example, may be based on any known or available microprocessor architecture, such as a Reduced Instruction Set Computing (RISC) using an ARM architecture, as commonly used today in mobile devices and other portable electronic devices. Alternatively, the processors 343, 552 for example, may be based on any known or available processor architecture, such as a Complex Instruction Set Computing (CISC) using an Intel architecture, as commonly used today in servers or personal computing devices. Of course, other processor circuitry may be used to form the CPU or processor hardware in nodes 111, 112.

It should be noted that a digital signal processor (DSP) or field-programmable gate array (FPGA) could be suitable replacements for the processor 343, 552. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 342, 553, or a memory of a computer used to download or otherwise install such programming into the nodes 111, 112, or a transportable storage device or a communications medium for carrying program for installation in nodes 111.

Figure 4:
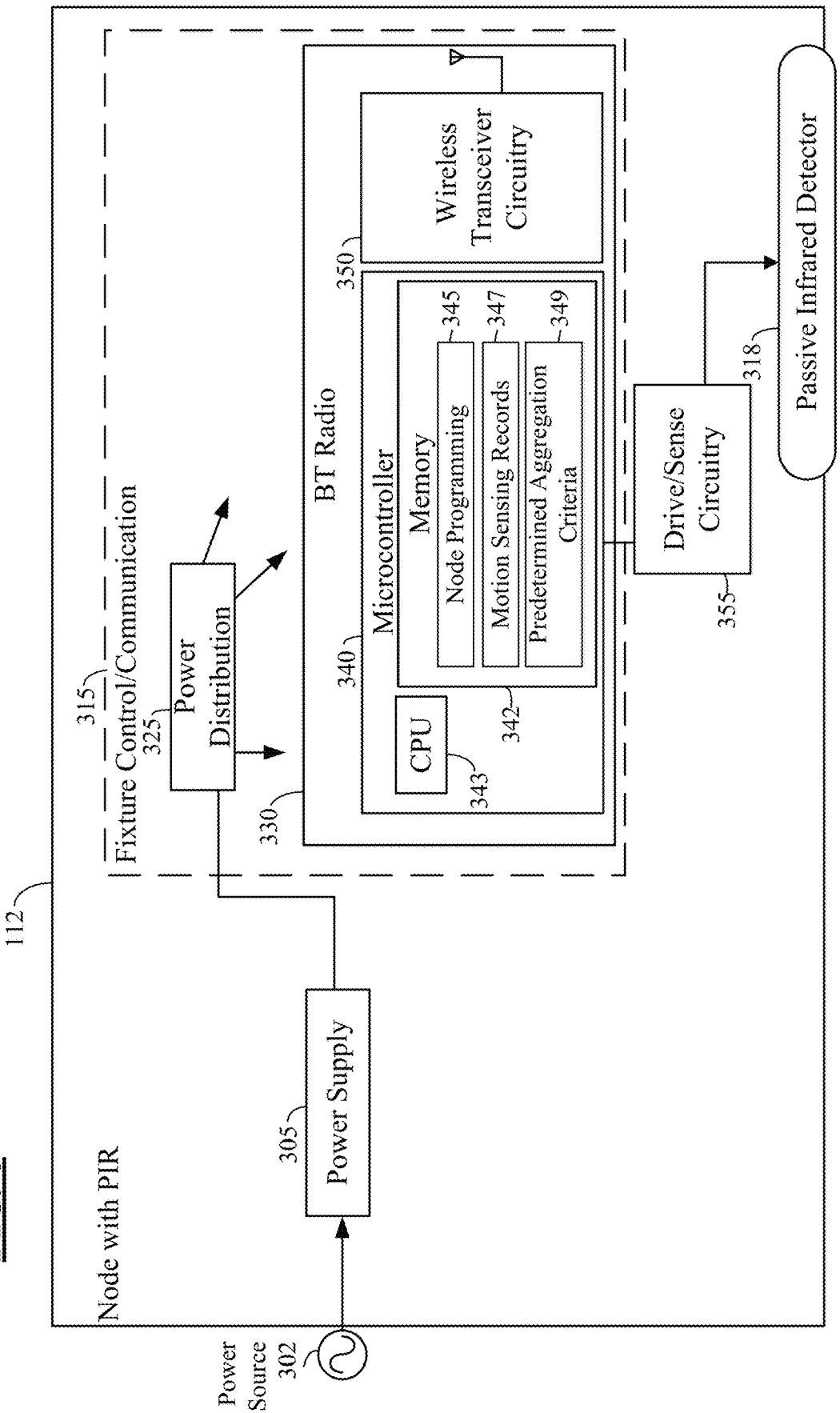
FIG. 4 is a high-level functional block diagram of a fixture example of a wireless enabled node without a light, having a passive infrared sensor.

Memory 342 like that shown in FIGS. 3-4 and memory 553 like that shown in FIG. 5 are for storing data and programming. In the example, the main memory system 342, 553 may include a flash memory (non-volatile or persistent storage) and a random access memory (RAM) (volatile storage). The RAM serves as short term storage for instructions and data being handled by the processor 343, 552, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with nodes 111, 112, including light fixture node with PIR 111 and node with PIR 112; as well as motion mapping server 120. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 342, 553, or a memory of a computer used to download or otherwise install such programming into the nodes 111, 112, or a transportable storage device or a communications medium for carrying program for installation in the nodes 111, 112.

As shown, the light fixture node 111 includes programming 345 in the memory 235, which configures the CPU 343 to control operations of the light source 320, including the communications over the Network communication interface(s) 350 via the wireless network interface(s) 350. The programming 345 in the memory 342 includes lighting control programming to control the light source 320 and detector programming to detect motion, create motion records, and send motion records to the motion mapping server 120.

The light fixture node with PIR 111 is able to implement the hardware and software required to perform motion detection and aggregation. The light fixture node with PIR 111 can communicate via the nodal wireless network 117 with the motion mapping server 120 running the motion mapping programming 207. Though the light fixture node with PIR 111 is distinguished by the passive infrared sensor 318, the passive infrared sensor 318 is an example detector: the function of the passive infrared sensor can be achieved by any device free location sensor, or any motion sensor.

Though this wireless enabled node 111 is depicted as a light fixture node, the wireless enabled node 111 is not limited to being a light fixture: any RF node that connects to a network 170 and has the hardware to the role of a member node of the consumer detection system 120 is a valid wireless enabled node 111.

To illustrate this, FIG. 4 shows a sparser node: a node with PIR 112. This node has a subset of the components, but operates substantially the same way with respect to the passive infrared sensor 318 as the light fixture node with PIR 111 of FIG. 3. The node with PIR 112 does not have the light source 320 or the driver circuit 310. The node with PIR 112 also does not necessarily have programming to operate any of these missing components: some examples may find it easier to load generic firmware onto any node within the detection system that includes luminaire control programming, or other operational programming. Additionally this node with PIR 112 could contain other hardware features, such as other types of sensors or electrical controls, and may include programming to control those other types of sensors or electrical controls. This node with PIR 112 could be mounted like a ceiling node 121, with a node sensing area 725 below the node with PIR 112.

FIG. 5 is a functional block diagram of a general-purpose computer system, by way of just one example of a hardware platform that may be configured to implement the motion mapping server (wireless enabled computing device) 120. The example wireless enabled computing device 120 will generally be described as an implementation of a server platform or host type computer, e.g. as might be configured as a blade device in a server farm or in network room of a particular premises. Alternatively, the computer system may comprise a mainframe or other type of host computer system capable of web-based communications, media content distribution, or the like via the network 131 and the on-premises nodal wireless network 117.

The motion mapping server 120 in the example includes a central processing unit (CPU) 552 formed of one or more processors, a main memory 553, and an interconnect bus 554. The circuitry forming the CPU 552 may include a single microprocessor, the circuitry forming the CPU 552 may include a number of microprocessors for configuring the computer system 140 as a multi-processor system, or the circuitry forming the CPU 552 may use a higher speed processing architecture. The CPU 552 is the motion mapping server processor of the motion mapping server 120. The main memory 553 in the example includes ROM, and RAM memory. In some examples the main memory may include cache memory if the CPU has specialized instruction sets, branch prediction, cache line replacement techniques, or other particularized configurations designed to improve the performance of the motion mapping server 120 the CPU 552 is installed within. Other memory devices may be added or substituted, including magnetic type devices (tape or disk) and optical disk devices that may be used to provide higher volume storage. The main memory 553 is the motion mapping server memory of the motion mapping server 120.

The back end server 120 runs a variety of applications programs and stores and processes various information in a database or the like for control of the light fixtures coupled to the Bluetooth Radio 558, wall controllers (not shown) and any other elements of the consolidated system 110 and possibly elements of an overall building managements system (BMS) at the premises. The Bluetooth radio 558 is the motion mapping server network communication interface of the motion mapping server 120. The programming and stored information includes the motion mapping programming 207.

In operation, the main memory 553 stores instructions and data for execution by the CPU 552, although instructions and data are moved between memory 553 and the CPU 552 via the interconnect bus 554. For example, the main memory 553 is shown storing mapped motion files 556, which contains motion sensing records 561. A portion or all of such a mapped motion files 556 may be transferred from main memory 553 and processed by the CPU 552 to divide the motion mapping data into portions for transport as contents of a sequence of packets to be sent over the network 131. The motion mapping server 120 holds the mapped motion files 556 generated by the motion mapping system. The main memory 553 stores the software programming 510 as needed for execution by the processor(s) forming the CPU 552. When so executed, the programming 510 and thus the CPU 552 configure the wireless enabled computing device 140 to perform the functions of the host computer, for relevant aspects of motion detection and aggregation described herein.

The CPU 552 and memory 553 may handle programs and files in a similar fashion for other functions of the consolidated system 110, such as control of the light fixtures at nodes 111, operation of any wall controllers (not shown) and any other elements of the lighting system and possibly control of elements of an overall building managements system (BMS) at the premises.

The computer system of the back-end server 140 also includes one or more input/output interfaces for communications, shown by way of example as a wireless transceiver 558 as well as one or more network interfaces 559 for data communications via the network 117. Although other wireless transceiver arrangements may be used, the example motion mapping server 120 utilizes a Bluetooth radio compatible with the particular iteration of Bluetooth protocol utilized on the wireless nodal network 117. The Bluetooth transceiver 558, for example, may be a Bluetooth radio of light fixture node 111 or a further type radio specifically adapted for integration and operation in a computing device like that used for the motion mapping server 120 that also is compatible with the applicable Bluetooth protocol. Each interface 559 may be a high-speed modem, an Ethernet (optical, cable or wireless) card or any other appropriate data communications device. The physical communication link(s) to/from the interface 559 may be optical, wired, or wireless (e.g., via satellite or cellular network).

Although not shown, the computer platform configured as the motion mapping server 120 may further include appropriate input/output ports for interconnection with a local display and a keyboard and mouse or with a touchscreen or the like, serving as a local user interface for configuration, programming or trouble-shooting purposes. Alternatively, system operations personnel may interact with the computer system of the motion mapping server 120 for control and programming of the consolidated system 110 from a remote terminal device via the Internet or some other link via any network 131.

The example FIG. 5 show a single instance of a back-end server wireless enabled computing device 120. Of course, the functions of the motion mapping server 120 may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the back-end server wireless enabled computing device 120 generally are conventional in nature, and it is presumed that those skilled in the art are sufficiently familiar therewith to understand implementation of the present system and associated lighting control technique using suitable configuration and/or programming of such computer platform(s) based on the description above and the accompanying drawings.

Figure 6:
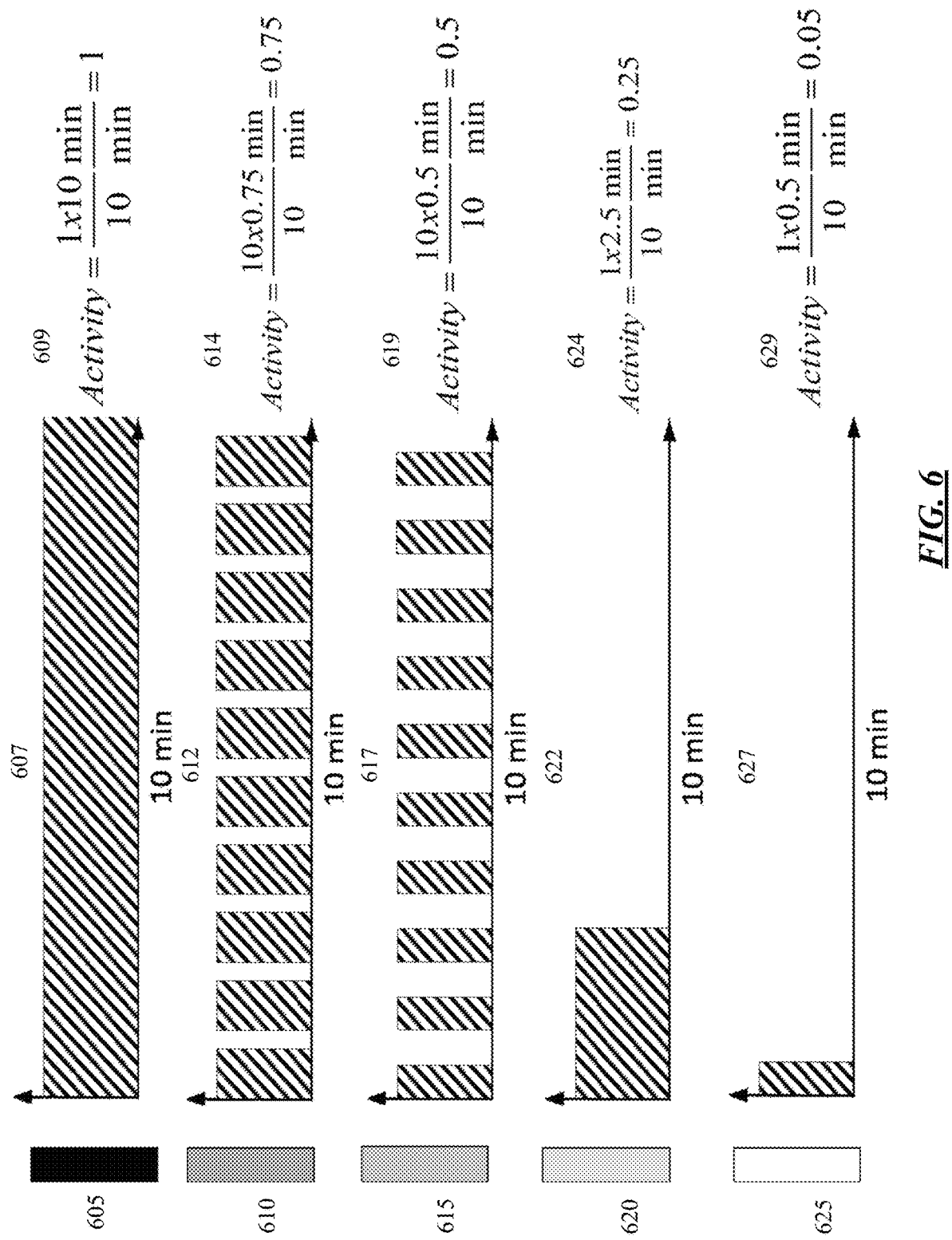
FIG. 6 is a series of bar graphs depicting how multiple motion detection records for a single node would be aggregated to result in an aggregated motion record for that node.

FIG. 6 is a series of color scales, bar graphs, and equations that display how much motion a ceiling light 121 actually detects. In the first column, there is a series of bars 605, 610, 615, 620, 625 that decrease in color. Darker colors represent more aggregated motion detected.

The second column includes a series of bar graphs 607, 612, 617, 622, 627 that decrease in overall area filled. The bars represent motion detected, as a binary value over time: these ceiling lights 121 are equipped with passive infrared sensors 318, and therefore can sense motion, or the absence of motion. Therefore, the bars are all the same height: the light 117 either detected motion at a given time, or it did not. Bar graphs 607, 612, 617, 622, 627 are depictions of the heat or weight of the motion captured, and the heat or weight of the motion capture can be represented in a wide variety of forms. The passive infrared sensors 318 in some examples capture information on an individual level such as the direction or magnitude of motion: however, in this example if motion is detected, then the binary switch is thrown and the bar graph 607, 612, 617, 622, 627 is populated at that time: otherwise, there is no bar at that time.

The third column includes a series of equations 609, 614, 619, 624, 629. These equations essentially take the proportion of the bar graph 607, 612, 617, 622, 627 that is filled in, and creates a ratio. This ratio determines how dark the bar 605, 610, 615, 620, 625 in the first column will be. An activity value of 1 represents constant motion detected by the ceiling light 121 during the entire ten minute window. An activity value of 0 would represent no motion detected by the ceiling light 121 at all during the entire ten minute window. The selected ten minute window is an example: the window of time could be any span of time.

The different bar graphs 607, 612, 617, 622, 627 also display some emergent properties of the motion detection. Bar graphs 607, 612, 617 show periodic movement over the ten minute window: either the entire time, 75% of the time, or 50% of the time. However, bar graphs 622, 627 show all of their movement at the very beginning of the ten minute window: the resulting activity equations cannot and do not represent this skew, as they only capture the average movement during the ten minute window. This standardizing of movement data can make it easier to process movement data over hours, days, or weeks.

Figure 7B:
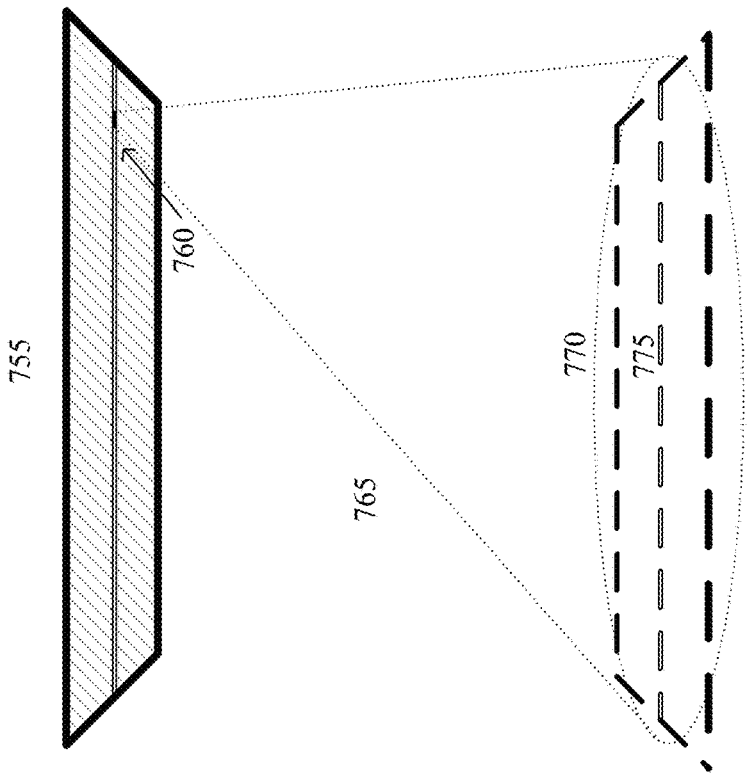
FIG. 7B is a depiction similar to 7A, where the passive infrared sensor is not centrally located.
Figure 7A:
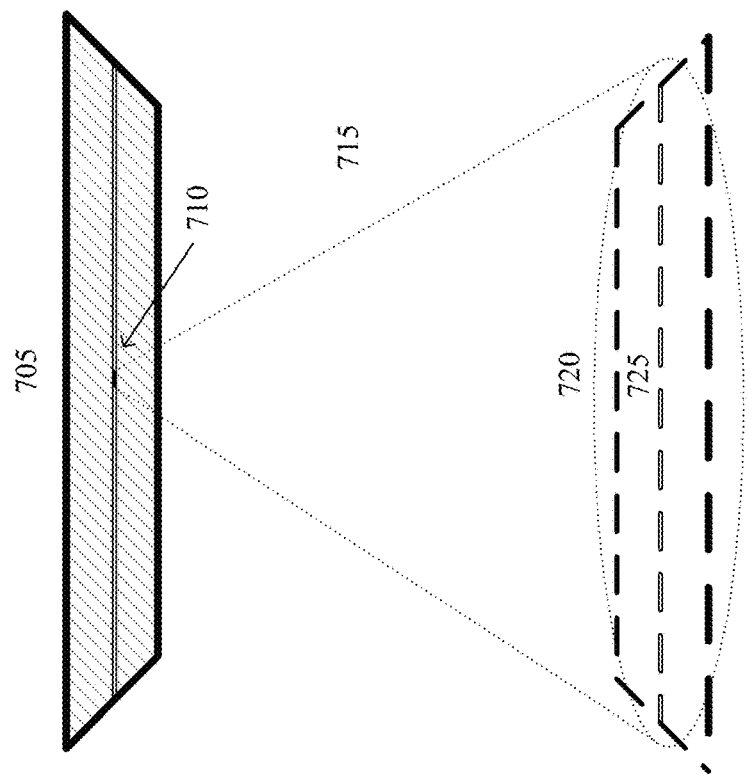
FIG. 7A is a depiction of a ceiling node with lights and a centrally located passive infrared sensor, illustrating the node sensing area below the ceiling node.

FIG. 7A is an illustration of a ceiling light 705 and the spatial relation between its passive infrared (PIR) sensor 710 and the area below the ceiling light 705. In this example, we can see that the PIR sensor 710 is physically embodied in a central location within the ceiling light 705. The sensor 710 has a cone-shaped pattern within which it senses for movement. This pattern is defined with a point emanating from the sensor, and extending away from the sensor in an increasing radius. Thus, when observed from the side, the pattern has a roughly triangular shape 715, widening as the infrared detection area approaches the ground. The pattern has an elliptical shape 720 when projected on the ground. The PIR sensor 710 in this example has had its lens adjusted so that the elliptical shape 720 within which the PIR sensor senses roughly encompasses the area of the ceiling light 705 itself. As an illustration, an outline 725 of the ceiling light 705 is drawn on the ground, to assist in showing that the elliptical shape 720 is of roughly the same area as the ceiling light outline 725, and therefore the ceiling light 705. Some examples may adjust the aperture of the PIR sensor 710 to cause the sensing area at ground level to fit entirely within the illustrated outline 725: this results in the corners of the illustrated outline not having sensors, but could isolate where movement occurs. Alternatively, other examples may adjust the aperture of the PIR sensor 710 to cause the sensing area at ground level to cover the entirety of the illustrated outline 725: this results in sensing motion outside of the outline 725 which may not be relevant, but doing so could further ensure all movement is detected. The elliptical shape 720 is one example of the shape overlaying the sensing area: the elliptical shape could be round, or any shape or pattern the PTR sensor 710 can be configured to detect motion within FIG. 7B is a similar illustration to FIG. 7A, except that the PIR sensor 760 is not centered laterally within the ceiling light 755: instead, it is placed more towards a side. This illustrates that the PIR sensors can be placed anywhere with access to the surface of the ceiling light 755, on a face of the ceiling light 755 that faces the desired motion detection direction. Here, the PIR sensor 760 is angled, and its aperture is adjusted so that the elliptical shape 770 cover the outline 775 of the ceiling light 755 in the same way that the PIR sensor 710 in FIG. 1A does. The vertical shape of the detection pattern 765 differs from the shape 715 in FIG. 1A, and covers a different shape of volume than the pattern 715 in FIG. 1A. However, since this example is designed to track foot traffic, the controlling pattern is the elliptical pattern 770 on the ground. In an example that needed to track airspace, then the shape of the pattern 765 leaving the PIR sensor 760 may be more important than the pattern 770 projected on the opposing surface. In such an example, the aperture of the PIR sensor 760 would be adjusted to have an appropriate angle and ellipses size to capture the appropriate motion data.

Figure 8:
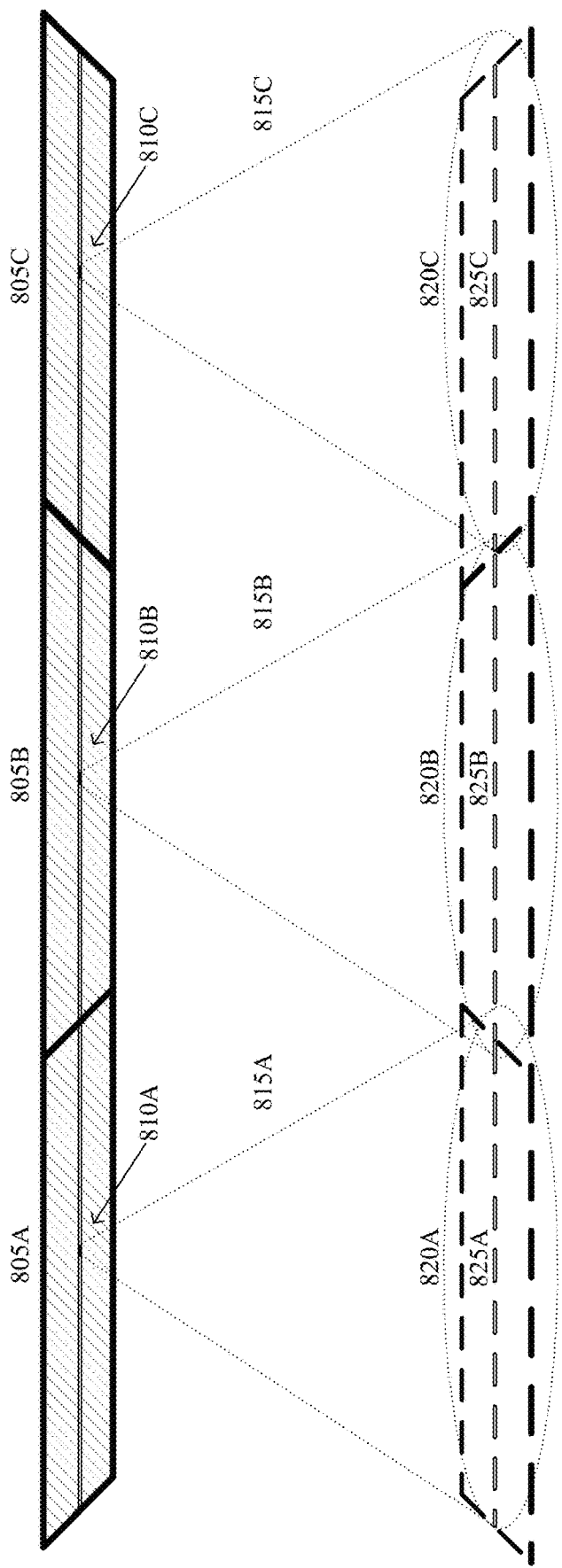
FIG. 8 is a depiction of multiple ceiling nodes with lights and a centrally located passive infrared sensor installed in series.

FIG. 8 illustrates how multiple light fixtures 805A-C with the design of the light fixture 705 from FIG. 7A could operate together to sense motion throughout a space. Here, there are three light fixtures 805A-C with their respective passive infrared (PIR) sensors 810A-C all centered and facing downward. Each sensor projects a field 815A-C that terminates in an elliptical shape 820A-C on the ground. When these light fixtures are connected in series, their sensor areas 820A-C can almost completely cover the area 825A-C below the light 805A-C.

Despite the overlap between sensor areas 825A-C in this example, these sensors create an effective sensing field 820A-C to detect foot traffic along the area underneath the lights 825A-C. These sensors being discrete also allow the operator to determine if customers are entering from the left, standing in the middle, then returning to the right. In such a scenario, there would be a moderate amount of sensed motion under the first light 805A, a high amount of motion senses under the second light 805B, and very little if any motion sensed under the third light 805C. This example of this system of lights 805A-C is able to discern the amount of motion under each light 805A-C, but does not measure the direction or speed under any individual light: the first light 805A only reports whether there is a presence or absence of motion in the sensing volume defined by the shapes 815A, 820A. Furthermore, the PIR sensors 810A-C do not differentiate between location of movement: for example, three seconds of movement on the edge of a detection ellipse 825C would count as motion equally to a person moving across a detection ellipse 825C in three seconds. In this example this level of detection allows for improved consumer anonymity and privacy. However, in another example, each ceiling light 805A-C could have multiple sensors, with exclusive sensing areas 825A-C: This could potentially capture more granular movement data, and could provide information related to the speed and direction of individual objects or groups of objects. Additionally, though in these examples the detection area 820A-C is elliptical, this is not a requirement: the lens and aperture of the PIR sensors 810A-C could be manufactured or configured into any shape, such as a rectangle proportional to the measurements of the ceiling light 805A-C, or could be oriented to track motion across a threshold, such as a doorway: due to this, the detection area 820A-C could be either two or one dimensional. Further, the PIR sensor 810A-C as an infrared sensor could be configured, based on average human body temperature, to only detect heat within a certain distance of the PIR sensor 810A-C. Therefore, if the PIR sensor 810A is mounted eight feet above a catwalk, which is an additional eight feet from the ground, the PIR sensors 810A could be configured to ignore heat signatures that indicate a body that is between nine and sixteen feet away. Other sensors, such as light detection and ranging (LIDAR) sensors, radio detection and ranging (RADAR) sensors, PIR arrays (Far infrared thermal sensor arrays), or thermal cameras, if used, could also be configured to only sense motion or objects a certain minimum or maximum distance from the PIR sensor 810A.

Figure 9:
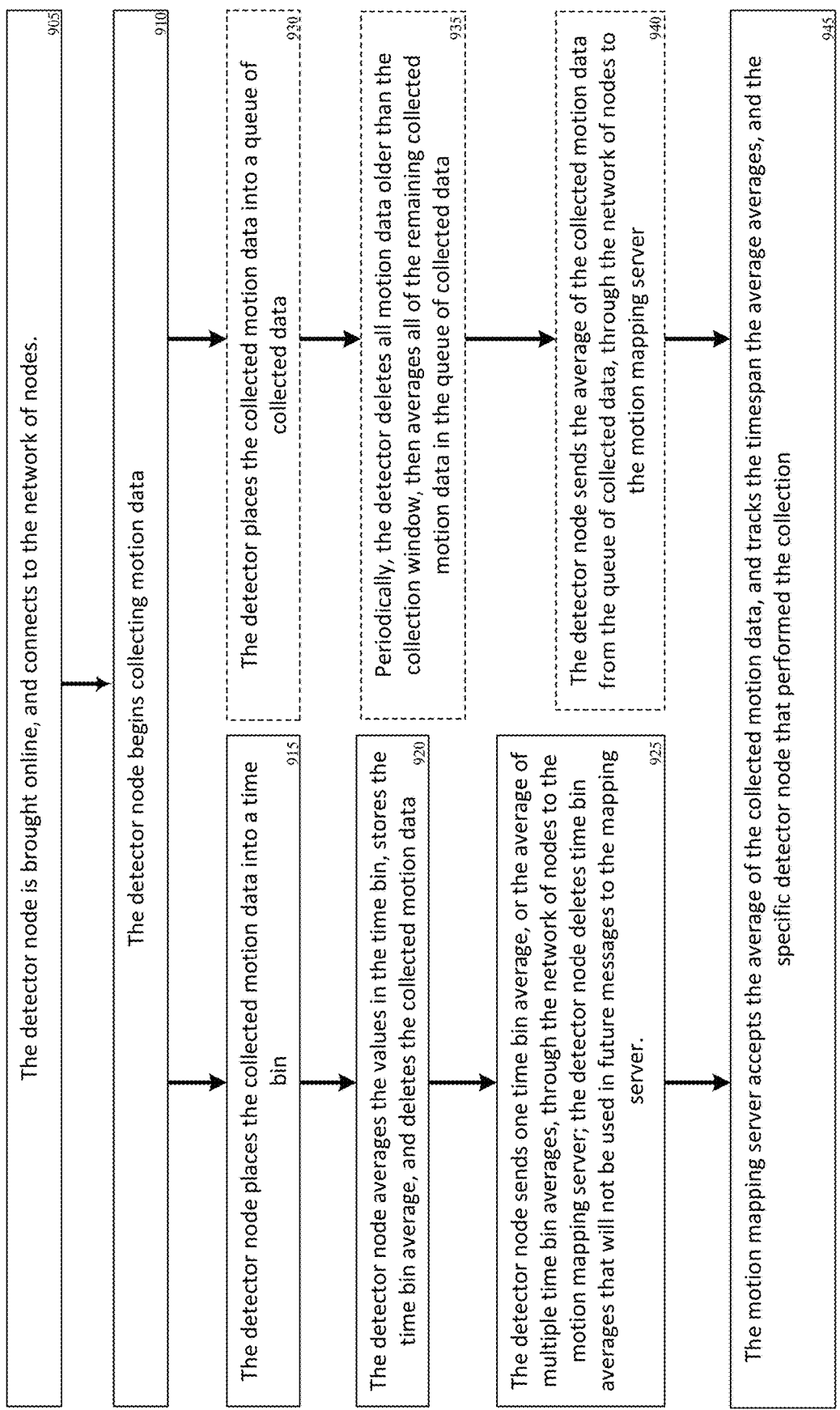
FIG. 9 is a flowchart of the example process for measuring movement over time, resulting in activity values similar to those found in FIG. 6.

FIG. 9 is a flowchart depicting an example method of measuring movement over time. This method is only an example, and other methods of measuring movement over time may be implemented. In block 905 a detector node is turned on and connects to the network: the detector node could be a node with PIR 112 from FIG. 4, a light fixture node with PIR 111 from FIG. 5, or some other example of a detector node contemplated elsewhere in this specification. The network is made up of other detector nodes 111, 112, and at least a motion mapping server 120.

In block 910, the detector node begins collecting motion data, by sensing motion in a node sensing area 725 during a period of time. This can be achieved multiple ways. For example, the detector node may start an internal timer when motion is detected, and stop the timer when motion is no longer detected. It may repeat this process, and end up with time ranges representing when motion is detected. This is an example of creating a motion sensing record 347 based on motion sensed in the node sensing area 725 by the motion sensor 318. Such a method may use less memory when there are not many switches between motion detected or non-motion, but could use a variable amount and a higher amount of memory if there is high variability in motion detection. Alternatively, the detector node may have a binary array, with a number of entries equal to a small period of time: for example, one second. In such an example, every one second the detector node moves to the next record in the array, and then records a True value in that record if motion is detected, and a False value if no motion is detected. After the last record in the array is reached, the detector node loops back around to the first record, and begins overwriting records, starting with the first record. In this storage method, the detector node may use on average a higher amount of memory, but will not use more memory than has been allocated for collection motion data. Additionally, if this storage method is implemented at a hardware level, the detector node has a hard limit on how many records it can store (e.g. ten minutes of records, one record per second is 360 memory locations) and can only increase the span of time for which it collects if each record covers a longer period of time (e.g. twenty minutes of records, at one record per two seconds.) There are a variety of ways to store time-lapsed sensor data that would be well-known to a person of ordinary skill in the art, and these are just illustrations of examples.

At this point, depending on the detector node, there are two examples of ways to aggregate information: By performing a time-binning process, starting in block 915, or a moving average process, which starts in block 930. This example node performs time binning, but moving average will also be illustrated. The selected strategy can be implemented at the hardware as well as the software level. A detector node could be capable of either or both strategies. A network of detector nodes can have each node perform the same aggregation method, or a combination of aggregation methods. Other aggregation methods of time-indexed data known to a person of ordinary skill in the art could be substituted.

Depicting the time binning process, block 915 takes the collected motion data, and stores it in a section of memory called a time bin. This time bin is generally a smaller period of time than the span of time that will be reported to the motion mapping server 120. For example, if the aggregation ultimately sent will describe a ten minute span, a time bin may be one minute. To implement this block, the detector node will collect data for one minute. Then, in block 920, the detector node will take the detailed collected motion data, and if motion is detected, it will store a True value as a first time bin average; otherwise, if no motion is detected, it will store a False value as the first time bin average. The creation of the True or False record is an example of creating a motion sensing record 347, based on motion sensed in the node sensing area 725 by the motion sensor 318. The detector node will then delete the collected motion data used for the first time bin average, emptying the time bin. Then, the detector node returns to block 910, and will collect another minute of motion data. The detector will place that collected motion data into the time bin in block 915, then a second time bin average will be stored based on the contents of the time bin. This process will continue as long as the detector node is attempting to collect motion data. In block 925, at least ten minutes have passed, and there are now ten time bin averages with True/False values. These ten values are placed into the formula 609 found in FIG. 6, to determine a coefficient of motion for that ten minute span. Calculating this coefficient of motion is an example of aggregating, based on a predetermined aggregation criteria 349, an aggregated motion sensing record comprising a selection of the motion sensing records 347 created by the node. The process in block 925 can be repeated every ten minutes, using time binned averages 1 through 10, then 11 through 20; or, it could occur more often, possibly with overlap. In such an example, it would use time binned averages 1 through 10, then 6 through 15, then 11 through 20. Once a time bin average is no longer needed to calculate an average of time binned averages, it can be deleted, freeing up memory. Once the coefficient of motion is calculated, the coefficient of motion is sent as averaged motion data from the detector, through the network of nodes to the motion mapping server. This is an example of sending a motion sensing record 347 into a system network or nodal wireless network 117, and in particular an example of sending an aggregated motion sensing record in a system network.

As an alternative, block 930 depicts the process for determining a moving average. Block 930 takes the collected motion data, and stored it in a section of memory structured like a queue. The newest motion data is placed at the end of the queue, and as the queue is processed that data moves towards the front. In block 935, periodically the detector takes a span of motion data, starting with the oldest data at the front of the queue, and averages the data from that point backward representing a span, of time, in this example ten minutes. This averaging may be an example of aggregating, based on a predetermined aggregation criteria 349, an aggregated motion sensing record comprising a selection of the motion sensing records 347 created by the node. In particular, it is an example where the predetermined aggregation criteria 349 aggregates one or more motion sensing records 347 by determining the percentage of time motion was sensed in the node sensing area 725, as compared to the total timespan of the period of time. If the periodicity for which the detector averages data is also ten minutes (meaning that the detector averages ten minutes of data every ten minutes), the detector will then delete from the queue all of the underlying data that was averaged. The queue will then re-fill with motion data, and in ten minutes the averaging and the deletion repeats. However, if the periodicity is shorter than the averaging span, for example one minute (meaning that the detector averages ten minutes of data every minute), the detector will then only delete from the queue the oldest one minute of data used in calculating the average. The queue will then re-fill with motion data, and in one minute the averaging and the deletion repeats. The span of averaging can be any amount of time, and the periodicity of the averaging can be equal to or less than the span of averaging. In block 940, the averaged motion data is sent from the detector, through the network of nodes to the motion mapping server. This sending of averaged motion data is an example of sending a motion sensing record 347 into a system network or nodal wireless network 117, and in particular an example of sending an aggregated motion sensing record in a system network.

In block 945, regardless of which averaging method is used by the detector node, the motion mapping server receives and accepts the average of the collected motion data sent by the detector node. The motion mapping server associates this data with the time the average represents, as well as the area over which the particular detector node collects data. The position of the detector node is previously known to the motion mapping server, and was provided by, for example, a provisioning technician who had mapped the location of the detector node in a computer-comprehensible coordinate system, with the coordinates either in reference to the space, the motion mapping server itself, or other nodes connected to the network. This positional averaged motion data is used by the process described in FIG. 10 to further summarize the motion data of the space.

Figure 10:
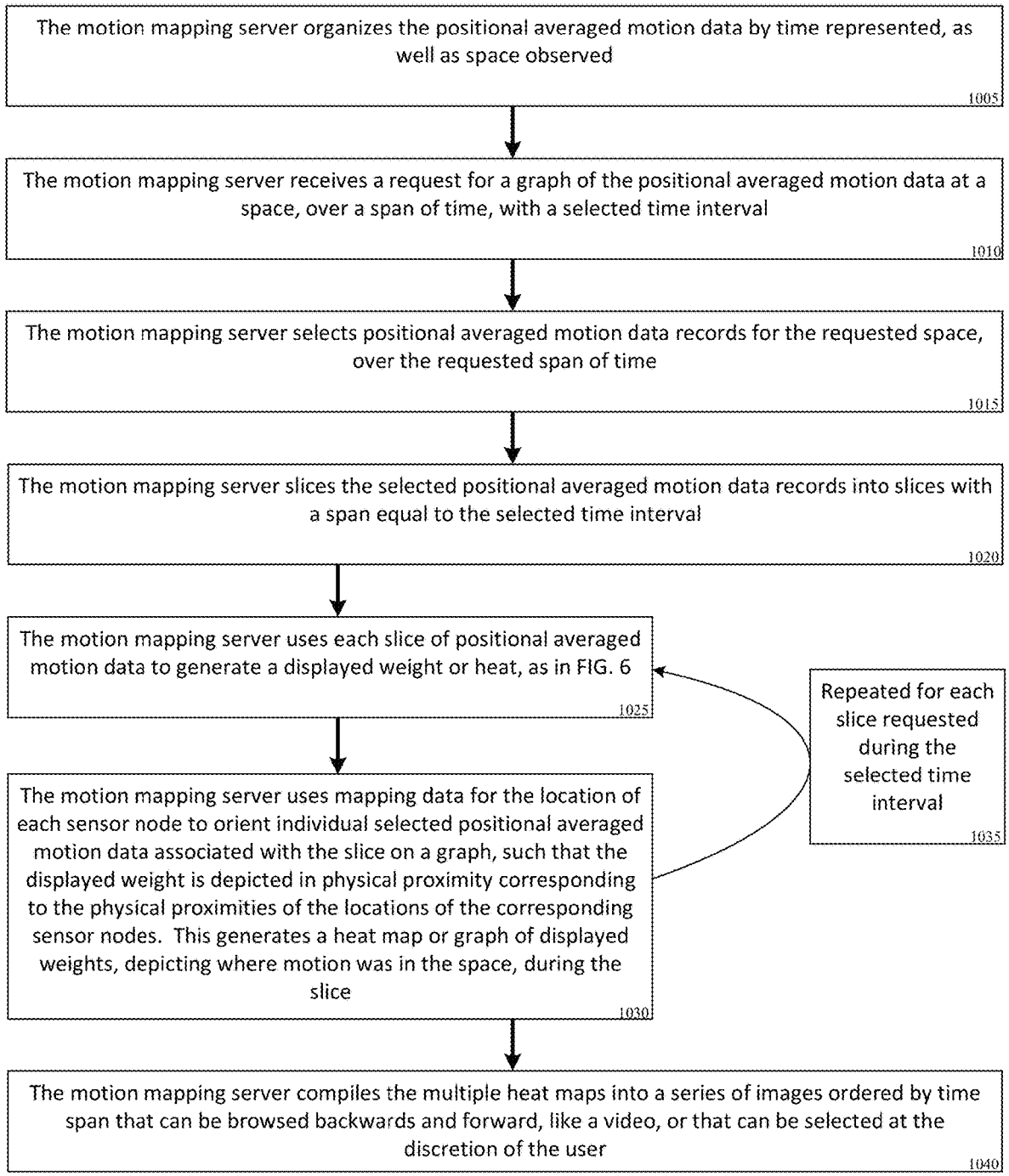
FIG. 10 is a flowchart of the example process for graphing movement over time and space, resulting in heat maps similar to those found in in FIG. 1.

FIG. 10 is a flowchart of an example method for compiling the positional averaged motion data generated in FIG. 9 into a user-friendly format to assist in motion analysis. In block 1005, the motion mapping server indexes as indexed records the received positional averaged motion data produced in FIG. 9. The motion mapping server indexes this data by the time span covered by the data, as well as the space observed. In other examples, the data may only be indexed by the space observed, or by the time represented: some examples may only need to represent values across multiple spaces, and other examples may only have a single observed space, making indexing by the identity of that space extraneous. Each of these indexed records therefore has a space, a position within that space, in this example represented by coordinates, a time span which the record is representing, and a value from 0 to 1 indicating the average ratio of how much motion was detected within those coordinates, during the time span of the record.

At a later point in time, a user makes a data query in block 1010. The motion mapping server is provided a time span to display, as well as the space this query is for. In some examples, multiple time spans as well as multiple spaces could be requested in a single query. Block 1015 describes the motion mapping server requesting some or all of the indexed data indexed in block 1005. The motion mapping server selects positional averaged motion data where the data is associated with the space from the user query, and where the positional averaged motion data is associated with a time within the span of the query. So, if the user requests motion data for a grocery store A, from 9 AM to 11 AM on Jan. 1, 2020, the motion mapping server should select all of the records created by a detector node positioned within grocery store A, where those records were created between 9 AM and 11 AM on Jan. 1, 2020. In this example, the time span selected by the user is a multiple of the time span of any given positional averaged motion data record. For example, each record spans ten minutes, so the user can only request data that begins or ends on an interval that can evenly fit a natural number of positional averaged motion data records. In other examples, the user could request any span of time, and if that span of time had a beginning or end point that lies within the span of time of a positional averaged motion data record, a process for selecting and using a partial record would be utilized. Each of these selected records therefore has the grocery store A as the space, a position within that grocery store A as the position, a time span which the record is representing, and a value from 0 to 1 indicating the average ratio of how much motion was detected within that position within the grocery store A, during the time span of the record.

In block 1020, the motion mapping server slices these records if needed into records that will be represented in the final data output. For example, if each record spans ten minutes, and the final data set shows data in ten minute intervals, then no action is taken. However, if the final data shows data in one hour intervals, then data related to each position within that hour must be averaged. In this example, the user has requested one hour of data, from 9 AM to 11 AM. However, the mapping server is configured to return data in one hour increments. Therefore, the mapping server, for each node within the space, averages the motion sensed by each node, during each hour. This means that the records for a given node starting at 9:00, 9:10, 9:20, 9:30, 9:40, and 9:50 are all averaged, and returned as a single record for that node, spanning from 9 AM to 10 AM. The same process is repeated for the second, and any subsequent hours. The return increment in this example is an hour, but it could be any span of time. At the end of this block, the motion mapping server has selected and sliced data, such that there is a single motion detection ratio value, per detector node in grocery store A, per hour.

In the following block 1030, the motion mapping server converts the data corresponding to a single slice of time into a graph, or map. In this example, the motion mapping server selects all of the records for grocery store A, for 9 AM. Then, the motion mapping server converts the motion detection ratio value from a number to a color or gradient that conveys that proportion. In this example, the motion mapping server does this by selecting greyscale colors from white to black, as seen in bars 605, 610, 615, 620, 625 in FIG. 6, where black represents a ratio of 1, white represents a ratio of 0, and greys represent values between 1 and 0. Next, the motion mapping server takes the coordinates associated with the record, which describe a shape and a location. This shape is placed on a graph in the associated location, and then is filled with the greyscale color based on the motion detection ratio. Shape placement is repeated for each node in the space. After shape placement, static information such as the contours of the space are added to the graph, and ultimately a graph or map as seen in FIG. 1A is created. This graph or map can be represented as a conventional map, or as a mathematical computer-readable graph. A map may be more useful for a human user to perform movement analysis with, whereas a mathematical graph may be more useful for a computational system to perform analysis upon.

Block 1035 indicates the processes of blocks 1025 and 1030 are repeated for each time slice requested. In this example, there are two slices: one from 9 AM to 10 AM, and a second from 10 AM to 11 AM. Therefore, after two cycles, two maps will be created: a first map of motion data averages throughout grocery store A from 9 AM to 10 AM, broken out into individual detector search areas, similar to the map shown in FIG. 1A, and a second map of motion data averages throughout grocery store A from 10 AM to 11 AM, broken out into individual detector search areas, similar to as shown in FIG. 1B. In block 1040, the mapping server combines these two maps into a single series of maps, so that the user is able to view the two maps as a single time-lapse of motion data. A user can then play the series like a video, watching any changes in motion detected over the span of time. Alternatively, single maps can still be removed from the series, and stored separately if the user so desires. Again, instead of storing this data as a human-readable map, the series of map data may be stored as mathematical, computer-readable data, to facilitate for example quantitative analysis.

Any of the steps or functionality of the detection and aggregation protocols in FIGS. 9-10 described herein can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or JOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks or solid state, such as any of the storage devices in any computer(s) or the like, such as may be used to implement the client device, media gateway, transcoder, etc. shown in the drawings. Volatile storage media includes dynamic and static memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF), infrared (IR), and laser data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The term "real-time" is to be understood as meaning that the time difference between a cause and effect is small enough that a user of a lighting system or an industrial system would not perceive a material delay between their action (e.g. pressing a button) and the system's reaction (e.g. a light turning on or off). A real-time delay is usually considered to be a sub-second delay.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected may lie in less than all features of any single disclosed example. Hence, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a plurality of nodes located within a space, each node comprising:
   a node network communication interface, connected to a system network;
   a device free location sensor, configured to each sense motion in a respective node sensing area, the respective node sensing area being within a portion of the space;
   a node processor coupled to control the device free location sensor and coupled to communicate via the node network communication interface;
   a node memory coupled to the node processor, configured to store a plurality of motion sensing records created by the node processor; and
   node programming in the node memory, wherein execution of the node programming by the node processor of a respective node configures the respective node to implement functions, including functions to:
      create a respective motion sensing record, based on motion sensed in the respective node sensing area by the device free location sensor, over the system network via the node processor of the respective node;
      store in the node memory of the respective node the respective motion sensing record; and
      send, via the node network communication interface of the respective node, the respective motion sensing record over the system network;
   a motion mapping server comprising:
   a motion mapping server processor;
   a motion mapping server network communication interface coupled to the motion mapping server processor, connected to the system network;
   a motion mapping server memory coupled to the server processor, configured to store the motion sensing record sent by the respective node; and
   motion mapping programming in the server memory, wherein execution of the motion mapping programming by the motion mapping server processor configures the motion mapping server to implement functions, including functions to:
      receive, via the system network, the respective motion sensing record of the respective node;
      determine, over an aggregated period of time comprising a span of time including a beginning point in time and an end point in time, an aggregated time node motion amount detected in the respective node sensing area of the respective node, by compiling the plurality of motion sensing records from the respective node created by the respective node during the aggregated period of time;
      determine, at an aggregated point in time comprising a single point in time, an aggregated space node motion amount detected in a node sensing areas of a subset or all of the nodes of the plurality of nodes, by compiling the plurality of motion sensing records from the subset or all of the nodes of the plurality of nodes created by the subset or all of the nodes of the plurality of nodes at a time substantially close to the aggregated point in time;
      compute a temporal aggregated motion amount detected in the respective node sensing area of the respective node over time, using the aggregated time node motion amount; and
      compute a spatial aggregated motion amount in the portion of the space, using the aggregated space node motion amount where the portion of the space correlates to the node sensing areas of the subset or all of the nodes of the plurality of nodes.

2. The system of claim 1, wherein:
   the device free location sensor is a passive infrared sensor (PIR).

3. The system of claim 1, wherein:
   the motion sensing area of a respective node is adjusted by changing a sensor field of view of the free location sensor via a focusing mechanism of the device free location sensor.

4. The system of claim 1, wherein execution of the node programming by the node processor of the respective node configures the respective node to implement functions to:

aggregate, based on a predetermined aggregation criteria, an aggregated motion sensing record comprising a selection of the motion sensing records created by the node processor of the respective node which are stored in the node memory of the respective node;

send, via the node network communication interface of the respective node, the respective aggregated record as a motion sensing record over the system network.

5. The system of claim 4, wherein:
the predetermined aggregation criteria aggregates one or more motion sensing records by determining a percentage of time the device free location sensor sensed motion during a second period of time, as compared to a total timespan of the second period of time.

6. The system of claim 4, wherein:
the predetermined aggregation criteria determines a percentage of time the-device free location sensor sensed motion as a running average.

7. The system of claim 4, wherein:
the predetermined aggregation criteria determines a percentage of time the device free location sensor sensed motion as a time-binned average.

8. The system from claim 1, wherein:
at least one of the plurality of nodes located within the space further comprises an illumination light source.

9. The system of claim 1, wherein:
the node network communication interface of a respective node is a wireless radio-frequency (RF) communication interface.

10. The system of claim 9, wherein:
the node sensing area of a ceiling node has a similar area to the ceiling node.

11. The system of claim 1, wherein:
the plurality nodes further comprises ceiling nodes, a subset of the plurality of nodes which are mounted within the space such that the node sensing area of any ceiling node is below the respective ceiling node.

12. The system of claim 1, wherein:
computing the temporal aggregated motion amount detected in the node sensing area of the respective node over time further includes graphing the temporal aggregated motion amount detected in the node sensing area of the respective node over time.

13. The system of claim 1, wherein:
computing the spatial aggregated motion amount in the portion of space further includes graphing the spatial aggregated motion amount in the portion of the space.

14. The system of claim 13, wherein:
graphing the spatial aggregated motion amount in a portion of the space further uses a map of the locations of the nodes within the space, and the area dimensions of the node sensing areas of each of the nodes within the portion of the space.

15. A method, comprising:
receiving, via a system network, a respective motion sensing record of a respective node;

determining, over an aggregated period of time comprising a span of time including a beginning point in time and an end point in time, an aggregated time node motion amount detected in a respective node sensing area of the respective node, by compiling a plurality of motion sensing records from the respective node created by the respective node during the aggregated period of time;

determining, at an aggregated point in time comprising a single point in time, an aggregated space node motion amount detected in a plurality of node sensing areas of a plurality of nodes, by compiling a plurality of sensing records from a subset or all of the nodes of the plurality of the nodes created by the subset or all of the nodes of the plurality of nodes at a time substantially close to the aggregated point in time;

computing a temporal aggregated motion amount detected in the respective node sensing area of the respective node over time, using the aggregated time node motion amount; and computing a spatial aggregated motion amount in a portion of a space, using the aggregated space node motion amount, wherein the portion of the space correlates to the plurality of node sensing areas of the plurality of the nodes.

16. The method of claim 15, further comprising:
graphing the temporal aggregated motion amount detected in the respective node sensing area of the respective node over time; and graphing the spatial aggregated motion amount in the portion of the space.

* * * * *